US006089005A

United States Patent [19]

Kallevig

[11] Patent Number: 6,089,005

[45] **Date of Patent: *Jul. 18, 2000**

[54] COMBINED TOW AND PRESSURE RELIEF VALVE FOR A HYDRAULICALLY SELF-PROPELLED LAWN MOWER

[75] Inventor: Jeffrey B. Kallevig, Eden Prairie, Minn.

[73] Assignee: The Toro Company, Bloomington, Minn.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/205,124

[22] Filed: Dec. 3, 1998

Related U.S. Application Data

[63] Continuation-in-part of application No. 08/798,656, Feb. 11, 1997, Pat. No. 5,901,536.

[51] Int. Cl.[7] .................... A01D 69/00

[52] U.S. Cl. .................... 56/10.9; 56/10.8; 56/11.1

[58] Field of Search .................... 56/10.9, 10.8, 56/11.1, 11.2, 11.9, DIG. 11; 251/83; 137/523

[56] References Cited

U.S. PATENT DOCUMENTS

| | | | |
|---|---|---|---|
| 1,482,233 | 1/1924 | Hewitt | 251/83 |
| 2,601,752 | 7/1952 | Rose | 56/DIG. 11 |
| 3,093,155 | 6/1963 | Dawes | 251/83 |
| 3,552,432 | 1/1971 | Wagner | 137/523 |
| 3,729,020 | 4/1973 | Koci et al. | 251/83 |
| 3,946,543 | 3/1976 | Templeton | 56/10.9 |
| 3,973,379 | 8/1976 | Ecker et al. | 56/11.2 |
| 4,967,543 | 11/1990 | Scag et al. | 56/11.1 |
| 5,518,079 | 5/1996 | Zvolanek | 56/11.1 |

*Primary Examiner*—Thomas B. Will
*Assistant Examiner*—Arpad Fabian Kovacs
*Attorney, Agent, or Firm*—Schwegman, Lundberg, Woessner & Kluth P.A.

[57] ABSTRACT

A combination tow and pressure relief valve for use in a hydraulic fluid circuit used in a hydraulically driven wide area lawn mower. The valve includes a cylindrical valve body having a hexagonal head. A slideable valve tip with a shank and a valve head has its shank slidably mounted within the valve body. The valve tip is biased by a spring to move in a direction away from the hex head. In operation, the valve is inserted into a suitable chamber placed in series with a bypass passage. The valve tends to block the bypass passage under steady state conditions. When a surge in hydraulic pressure occurs, as would occur in response to operator input or at startup, the hydraulic fluid overcomes the bias of the spring and urges the valve tip away from the otherwise blocked orifice which links the bypass passage to the chamber. Opening the orifice tends to diminish the magnitude of the pressure peak and helps eliminate jerky starts of the mower. The spring eventually overcomes the reduced hydraulic fluid pressure and returns the head of the valve tip into a sealed relationship with the bypass passage orifice. A shoulder nut permits the valve to be secured at a fixed position within the chamber. Varying the position of the valve within the chamber permits adjustment of the absolute value of the peak pressure which will be reached within the bypass passage. Loosening the valve further permits its use as a tow valve, so that the associated mower can be moved without skidding of the mower tires or actually starting the mower engine. Closing the valve further permits maximum operating pressure availability for larger and heavier equipment.

11 Claims, 9 Drawing Sheets

COMBINED TOW AND PRESSURE RELIEF VALVE FOR A HYDRAULICALLY SELF-PROPELLED LAWN MOWER

RELATED APPLICATION

This application is a Continuation-In-Part application of Ser. No. 08/798,656 entitled "Combined Tow and Pressure Relief Valve for a Hydraulically Self-Propelled Lawn Mower" which was filed on Feb. 11, 1997, now U.S. Pat. No. 5,901,536.

FIELD OF THE INVENTION

This invention relates generally to the field of fluid flow and pressure regulation devices, and more particularly to a device that permits selective and automatic depressurization of a hydraulic fluid circuit that is typically used in conjunction with a hydrostatic pump and hydraulic motor for a wide area mower.

DISCUSSION OF RELATED TECHNOLOGY

A hydrostatic pump is typically a variable displacement pump that is used in a hydraulic circuit in combination with a hydraulic motor. Such a combination is often used to propel vehicles having power requirements on the order of 12 to 20 horsepower. An example of such a vehicle is a hydraulic drive wide area lawn mower. It is common for a wide area mower to have two hydraulic pumps and two motors, one of each for each driving wheel of the mower. When used in this manner, an infinitely variable speed range between zero and vehicle top speed in both the forward and reverse directions is attainable. The typical hydraulic circuit in these applications is closed and kept fully charged, which prevents cavitation, provides cooling while the vehicle is operating, and which also provides braking.

The braking effect is due to the fact that the typical pump/motor circuit, when fully charged, offers considerable resistance to rotation of the motor. Since the wheels of a typical vehicle are each mechanically attached to the hydraulic motor shaft, any attempt to move the vehicle by pushing or towing while the vehicle's wheels remain in contact with the ground will result in rotation of the wheels and hydraulic motor. This rotation of the hydraulic motor will cause fluid in the hydraulic circuit to flow. The flow path will typically be blocked by the hydrostatic pump. In this situation, the hydraulic motor is performing as a pump while the hydrostatic pump is performing as a closed valve or as a highly restricting flow valve. In a typical installation, such as a cart or lawnmower, the amount of resistance provided by the hydraulic motor is beyond the ability of a person of average strength to overcome.

If mechanical assistance is used to tow such a vehicle, there is a likelihood that the wheels will skid rather than rotate. In certain applications, such as in a turf or golf course maintenance vehicle, such scuffing of the turf is completely unacceptable. Finally, there is often a need to move the vehicle a short distance across a garage or storage shed floor. There are two basic solutions to this problem.

The first solution is to simply start the vehicle and drive it over the distance required, even if the distance is only a few feet. This procedure is annoying because of its consumption of time and fuel and may cause unnecessary wear by operating the vehicle for such a brief period before normal operating temperatures and pressures have been reached. Also, it may not be practical to start and drive the vehicle during service or repair.

A second solution is to introduce a tow valve into the hydraulic circuit, typically in a dedicated path that bridges the input and output sides of the hydraulic pump. The bypass valve is typically formed as a threaded shaft which is inserted into a cylindrical fitting or bore formed in a manifold which joins the input and output hydraulic lines. When the valve body is fully inserted into the bore, the input and output hydraulic lines are isolated from each other, thereby permitting the hydraulic circuit to be fully pressurized and inhibiting rotation of the hydraulic motor. When the valve body is partially removed from the bore, the input and output lines are hydraulically interconnected and thus fluid can flow freely from the input to the output side of the motor without having to turn the hydrostatic pump. Thus, the vehicle can be moved without needing to start the vehicle and drive it.

Vehicles with a high power to weight ratio which are propelled using a manually actuated hydraulic propulsion system often have another unique performance problem. Abrupt changes by the user of the manually actuated control means may result in abrupt, impulsive-type variations in overall vehicle speed. Such acceleration may result in unexpected and undesired dynamic behavior. State of the art devices address this problem by using a pressure relief valve. Such a pressure relief valve operates to relieve excess pressure within the hydraulic system by bypassing some of the oil at high pressure to the low pressure side of the system. When the oil is bypassed, the pressure on the high pressure side drops to some extent. The pressure relief valve is typically separate from any tow valve.

SUMMARY OF THE INVENTION

The present invention provides a combination tow and pressure relief valve. The valve can include an orifice engaging tip, a biasing element abutting the orifice engaging tip wherein the biasing element urges the orifice engaging tip into an abutting relationship with an orifice residing within a hydraulic circuit formed by a pump and a motor, and a valve body oriented in a fixed relationship with the hydraulic circuit, wherein the body retains the biasing member and the orifice engaging tip such that the biasing member and the orifice engaging tip are movable along a single axis.

The present invention also includes a threaded cylindrical region on the valve body wherein the threaded cylindrical region is adapted to engage a threaded bore residing within the hydraulic circuit.

The present invention also includes a valve body with a tool engaging head for accepting a tool for rotating the valve body wherein rotation of the valve body causes it to move axially with respect to the threaded bore. Rotation of the valve body in a first direction causes the valve body to compress the biasing member between the valve body and the orifice engaging tip, thus urging the orifice engaging tip against the orifice with greater force and providing a higher hydraulic pressure relief threshold. Rotation of the valve body in a second direction causes the valve body to decompress the biasing member thus reducing the force with which the orifice engaging tip engages the orifice providing a lower hydraulic pressure relief threshold.

The present invention also includes a combination tow and pressure relief valve wherein sufficient rotation of the valve body in the second direction causes the orifice engaging tip to pull completely away from the orifice, thus providing relatively uninhibited flow of oil through the orifice.

The present invention also includes an improved lawn mower with a frame, an engine mounted on the frame, and a cutting deck mounted on the frame and receiving power from the engine. The improved lawn mower also includes a drive wheel mounted on the frame for propelling the mower, a hydraulic pump mounted on the frame and receiving power from the engine, and a hydraulic motor upon which the drive wheel is mounted, the motor receiving hydraulic power from the pump and providing power to the drive wheel. The improved lawn mower also includes a hydraulic control mechanism for controlling the overall direction and speed of the lawn mower. The improved lawn mower also includes a combination tow and pressure relief valve wherein the valve relieves excess hydraulic pressure developed between the pump and the motor upon rapid changes in the position of the operator control means and wherein the valve can be adjusted to permit the mower to be manually pushed from one point to another with relative ease by allowing hydraulic oil to bypass the pump through a bypass orifice. The valve can be adjusted to provide a higher or lower pressure relief setting for a variety of size and weight mowers.

DETAILED DESCRIPTION OF THE PREFERRED EMBODIMENT

Figure 1:
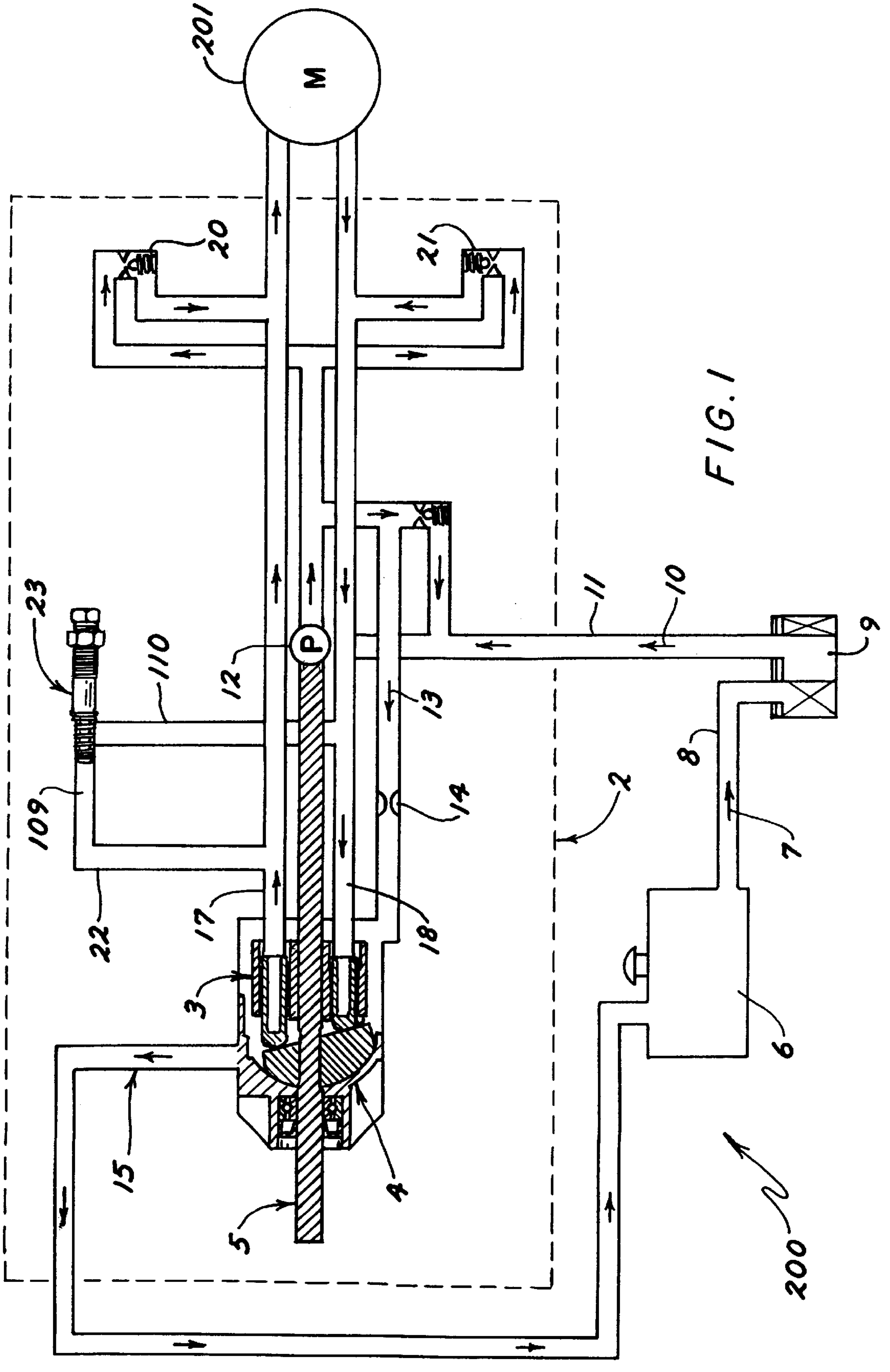
FIG. 1 is a schematic diagram of an hydraulic circuit incorporating the combined acceleration/tow valve of the present invention.

Referring particularly to FIG. 1, a hydraulic system 200 is depicted. The hydraulic system 200 is utilized as a drive system for the wide area lawn mower 130 with a cutting deck 133 and a frame 135 depicted in FIG. 15. The wide area mower 130 actually includes two sets of these hydraulic drive systems 200. Each drive wheel 132, 134 of the mower 130 is powered by a separate hydraulic motor (201). Each motor 201 is powered by a separate hydraulic pump assembly 2. An internal combustion engine 131 provides power to the hydraulic pumps 2. Wide area mower 130 further comprises a hydraulic control mechanism 250 for controlling the overall direction and speed of mower 130 during operation. Hydraulic control mechanism 250 enables the operator to separately control the speed and direction of each drive wheel 132, 134 by separately controlling the flow rate and direction of oil from each associated pump 2. This permits forward and reverse travel of the mower 130. This also provides a means for steering the mower 130 right or left.

In a preferred embodiment, operator control means 250 is positioned at the rearward and upward end of the handle member 155 which extends from the cutting deck 133 and frame 135. Control means 250 preferably includes right hand drive lever 251 and left hand drive lever 252. Operator presence control members 253 and 254 extend upwardly from the handle grips 255 and 256 of the handle member 155. Neutral lock latches 257 and 258 are interconnected to the drive levers 251 and 252 and will be described below as to function. A speed control lever 259 is centrally located between the handle grips 255 and 256. An engine throttle control 260 is located between the speed control lever 259 and the right handle grip 255.

Operation of the hydraulic control mechanism 250 is as follows. The operator starts the engine 131. At this point, the control mechanism is in neutral and the mower is not propelled. To begin propelling the mower in a forward direction, the operator must first depress at least one of the operator presence control levers 253 or 254. Next, the operator must move the speed control lever 259 forward to the desired maximum speed. Next, the operator slowly squeezes both the drive levers 251 and 252 while moving the neutral lock latches 257 and 258 from the neutral lock position. Then, the operator can slowly release both drive levers 251 and 252 to begin the forward propulsion of the mower. The levers 251 and 252 are biased away from the handle grips 255 and 256 and are thus biased to the maximum forward propulsion speed as set by the speed control lever 259. The operator can steer the mower to the right by squeezing the right lever 251 toward the hand grip 255 while maintaining the setting of the left lever 252. A left turn is accomplished by squeezing the left lever 252 while maintaining the position of the right lever 251. By pulling the levers 251 and 252 all the way back toward the handle grips 255 and 256 and past the neutral position, the mower can be propelled in the reverse direction. If the operator releases the presence control levers 253 and 254, the engine 131 will kill unless the mower blade is disengaged and the speed control lever 259 is set in its neutral position. The mower blade is engaged and disengaged via blade lever 261.

Control mechanism 250 as described above is commonly known in the mowing industry as a "pistol grip" control system. While the system described herein is the preferred embodiment of the present invention, variations of the control mechanism will still fall within the scope of the invention herein. For example, any traction drive control mechanism utilizing the squeezing motion of one or more levers relative to a handlebar grip would be considered to be within the scope of this invention.

The control mechanism 250 further includes right and left control rods 151*a* and 151*b*. Control rods 151*a* and 151*b* are each pivotally connected to the right and left drive levers 251 and 252, respectfully. The control rods 151_a_ and 151_b_ are coupled at their lower, inner ends to direct proportional displacement controls (not shown) for each pump assembly 2. Operator movement in the position of the right and left drive levers 251 and 252 relative to the handlebar grips 255 and 256 produces movement of a swashplate control shaft (not shown) and results in a proportional swashplate 4 movement which changes pump 2 flow and/or direction. Thus, overall movement of the mower 130 across the turf is controlled by the movement of control mechanism 250.

Each hydraulic system 200 includes a variable displacement pump assembly 2 that includes a cylinder block assembly 3 which houses variable swashplate 4 and input shaft 5. Hydraulic fluid is stored in reservoir 6 and enters the system flowing in the direction of arrow 7 through conduit 8. An inlet filter 9 is required to insure that only clean fluid enters the system 200. The fluid travels in the direction of arrow 10 through conduit 11, where the fluid enters charge pump 12.

The charge pump 12 supplies fluid to keep the closed loop charged, preventing cavitation and providing cool oil flow 13 for the system 200. The oil passes through orifice 14 to prevent the charge pump 12 from supercharging the hydrostatic pump 3. The hydraulic fluid enters the cylinder block 3. A case drain line 15 is provided to return oil to the reservoir that leaks past the pump shaft seals.

Either of the main hydraulic passages 17 or 18 can theoretically be at high pressure, which can typically exceed 1000 psi at normal operating conditions. FIG. 1 shows oil flowing through conduit 17 and returning through conduit 18 which, in this configuration, provides forward travel of mower 130. Two charge check valves 20 and 21 are used to direct make up fluid into the low pressure side of the closed loop. In practice, a vehicle which primarily moves only in one direction, such as forward in the case of a lawnmower, would have conduit 17 as the high pressure side and conduit 18 as the low pressure side. A bypass line 22 interconnects conduit 17 with conduit 18.

Referring also to FIGS. 2–4, 12 and 13, the pressure relief/tow valve 23 can be seen to reside in the bypass line 22. The valve 23 includes a valve body 24 which is preferably formed of a single piece of a hard, durable material such as steel, which can be zinc plated for wear or corrosion resistance. The overall length 33 of valve body 24 is approximately 2.76 inches. In a preferred embodiment, the valve body 24 is formed to include a first end 25 having a hexagonal head with a distance between opposing faces of approximately 0.625 inch. The second end 35 of the valve body 24 includes a bore 135 having a depth 36 of approximately 0.94 inch and a diameter 37 of 0.122 inch. The entrance to the bore 135 includes a 30° chamfer 38 with a width 39 of 0.030. The entrance to the bore can be configured in a number of ways including the use of larger chamfers. That is, the chamfer at the entry to bore 135 can be configured so as to have a wider opening to facilitate ease of insertion of the valve tip 52, which is discussed below. Selection of the desired chamfer at the entry to bore 135 affects assembly of the valve assembly 23 but does not affect performance of the valve once it is assembled and operating.

Figure 3:
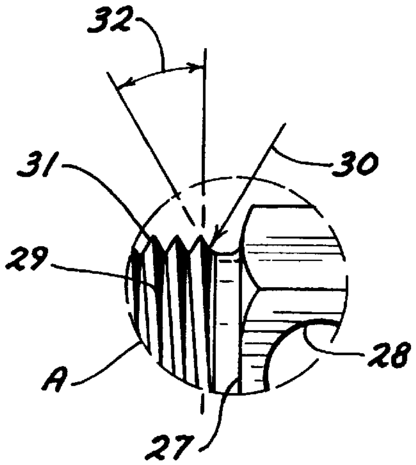
FIG. 3 is an enlarged elevation of the region B as depicted in FIG. 2.

Perpendicular to the longitudinal axis 26 of the valve body 24 and passing through hex head 25 is a 0.266 inch diameter orifice 28 into which a screwdriver shaft or similar implement may be inserted to assist with manual rotation of the head 25. The nominal distance 46 between the surface 27 and the longitudinal axis 47 of orifice 28 is 0.20 inch. As best seen in FIG. 3, the surface 27 of head 25 transitions to a threaded shank 29 through a 0.03 inch radius 30. The shank diameter 34 at the shoulder 30 is nominally 0.530 inch. The threads 31 have flats inclined at an angle 32 of approximately 30°. The distance 147 between base 27 and the hex head surface 43 is about 1.82 inch. Typically, a portion 49 of the valve body 24 is unthreaded, beginning at shoulder 50. The distance 51 between shoulder 50 and surface 35 is, in one embodiment, approximately 0.80 inch.

Figure 2:
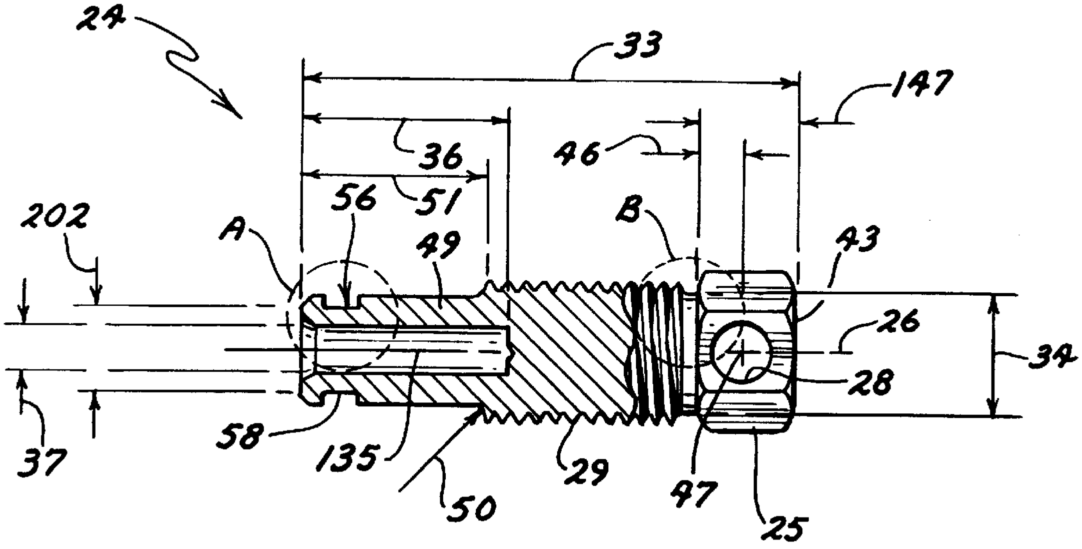
FIG. 2 is a side elevation of the valve body as utilized in the present invention.
Figure 4:
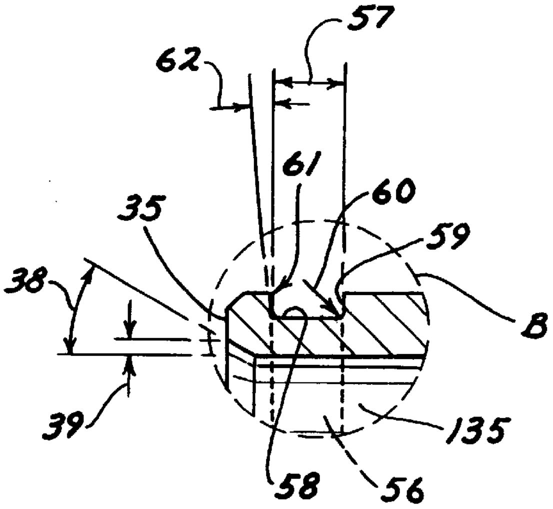
FIG. 4 is an enlarged elevation of the region A as depicted in FIG. 2.
Figure 12:
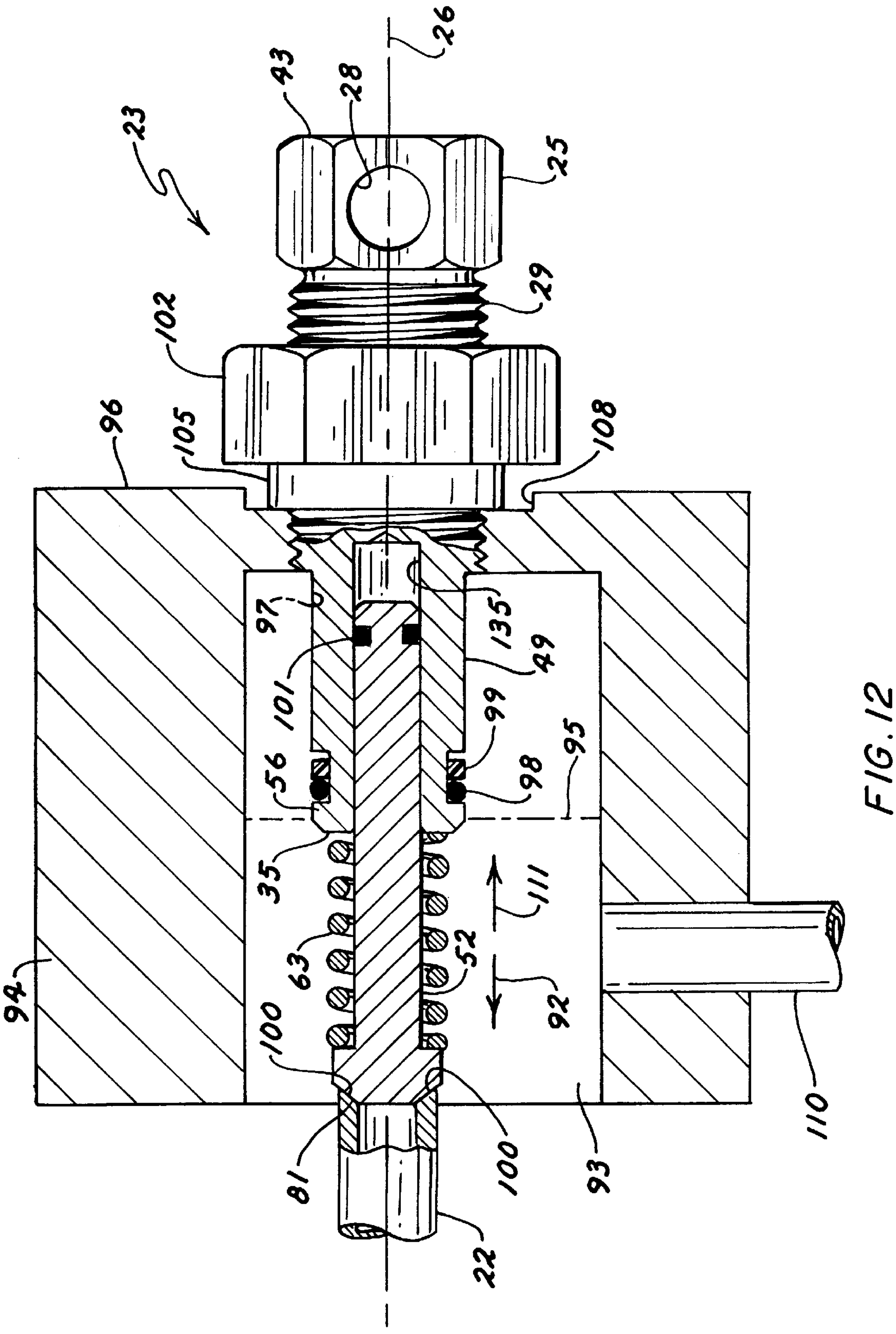
FIG. 12 is a side elevation of the assembled combination pressure relief/tow valve of the present invention as inserted into a hydraulic system bypass cavity.
Figure 13:
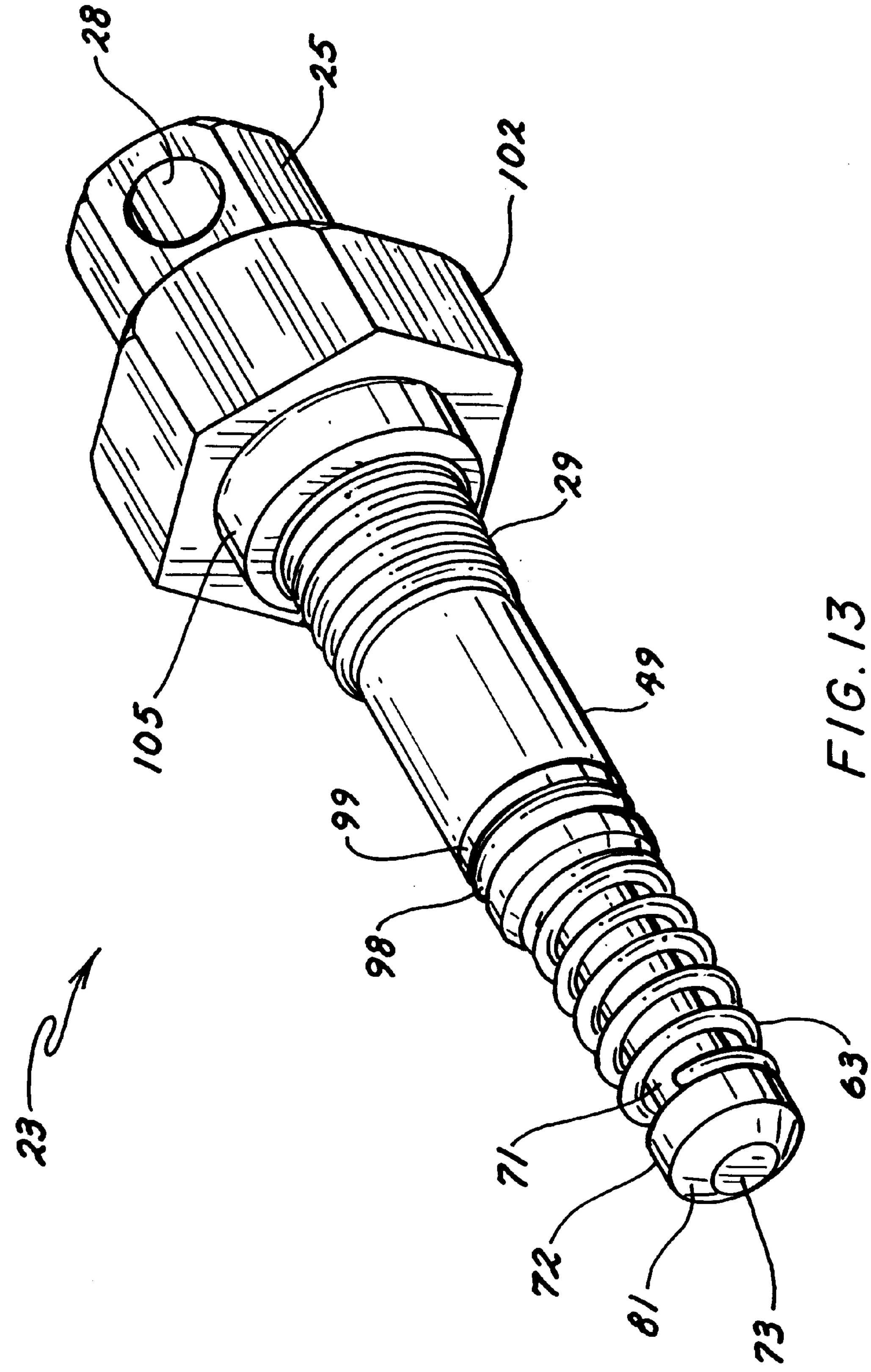
FIG. 13 is a perspective view of the combination pressure relief/tow valve depicted in FIG. 12.

Referring also to FIGS. 2, 4 and 12, details of the O-ring 98 and spacer 99 retaining groove 56 can be seen. The width 57 of groove 56 is approximately 0.159 inch. The groove floor 58 joins groove wall 59 through a radius 60 of approximately 0.010 inch. The edge 61 of the groove wall 59 is beveled at an angle 62 of about 5°. The diameter 202 of the valve body 24 at the bottom of groove 56 is approximately 0.38 inch.

Figure 5:
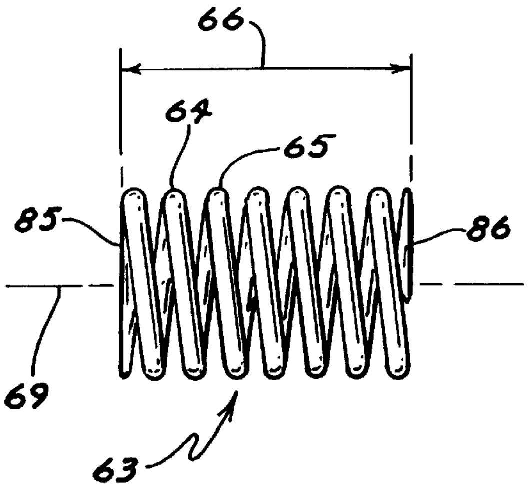
FIG. 5 is a side elevation of a spring element as utilized in the present invention.
Figure 6:
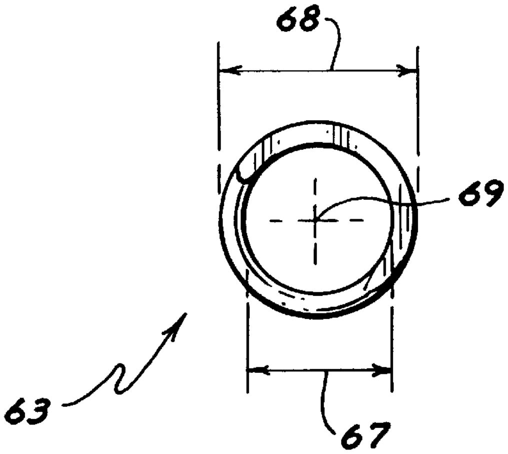
FIG. 6 is an end elevation of the spring element as depicted in FIG. 5

An additional component of valve 23 which is best seen in FIGS. 5, 6 and 12 is spring 63. The spring is typically constructed of a resilient material such as 0.067 inch diameter music wire. The total number of complete coils 64 and 65, for example, is nominally seven. The free length 66 is approximately 0.70 inch. The inside diameter 67 is about 0.250 inch, while the outside diameter 68 is 0.385 inch. These parameters result in a spring rate of 181.9 pounds per inch and a compressive force of 36.37 pounds when spring 63 is compressed to a length of 0.50 inches. When fully compressed, the spring 63 has a length of approximately 0.469 inch. The spring 63 fits over the valve tip 52, which is discussed below.

Figure 9:
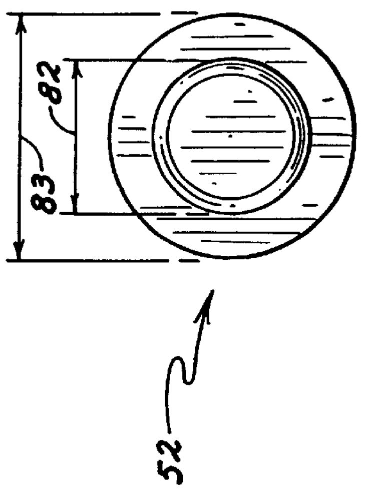
FIG. 9 is a rear elevation of the valve tip element as depicted in FIG. 7.
Figure 8:
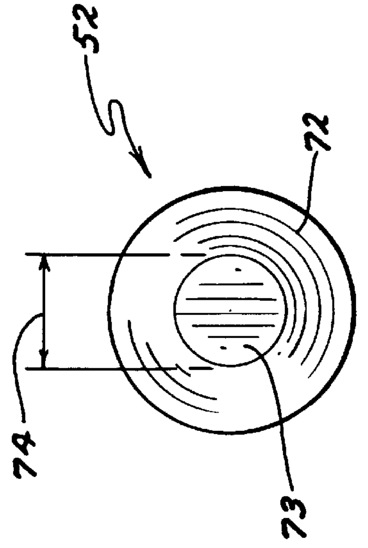
FIG. 8 is a front elevation of the valve tip element as depicted in FIG. 7.
Figure 7:
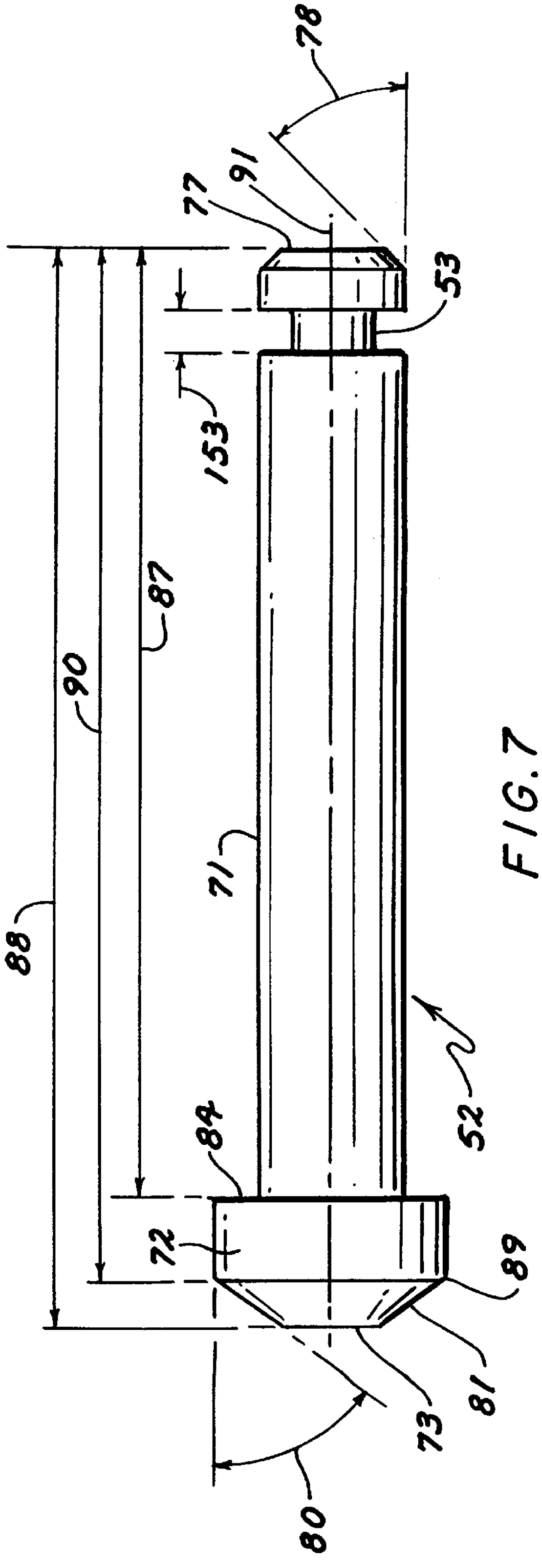
FIG. 7 is a side elevation of a valve tip element as utilized in the present invention.

The valve tip or orifice engaging element 52 is preferably formed of a single piece of a hard, durable material such as steel, and is preferably hardened for improved strength and wear resistance. As seen in FIGS. 7, 8 and 9, the valve tip 52 is formed so as to have a shank region 71 and an enlarged head 72. The overall length 88 of valve tip 52 is typically 1.63 inch. The length 87 of shank 71 is nominally 1.44 inch. The head 72 is formed partially as a truncated cone 81 having a relatively flat tip surface 73 having a diameter 74 of approximately 0.15 inch. The angle 80 of the cone 81 is approximately 54°. The base 89 of the cone 81 is displaced a distance 90 of about 1.56 inch from the shank end wall 77. The end wall 77 is beveled at an angle 78 of approximately 45°. Valve tip 52 also includes a groove 53 for accepting an O-ring 101 (see FIG. 12). Groove 53 has a width 153 of 0.07 inch and a depth of approximately 0.13 inch. When O-ring 101 is placed in groove 53, valve tip 52 is better retained in bore 135 of valve body 24 and is less likely to fall out of valve body 24 when valve assembly 23 is not secured in the hydraulic system as shown in FIG. 1. Also, valve tip 52 will better follow valve body 24 as it is turned out of the receiving hydraulic system component.

The outside diameter 82 of the shank 71 is approximately 0.22 inch, while the outside diameter 83 of the head 72 is about 0.35 inch, leaving an endwall 84 with a nominal wall of 0.06 inch. When valve 23 is assembled, the first end surface 85 of spring 63 abuts endwall 84, while the second end surface 86 of spring 63 abuts the second end 35 of valve body 24. The longitudinal axis 91 of valve tip 52 is substantially coaxial with valve body axis 26 and spring axis 69 when properly assembled as shown in FIG. 12. The effect of the spring 63 is to bias the valve tip 52 in the direction of arrow 92.

In operation, several additional components are needed to permit the practical use of the valve 23. As seen in FIG. 12, the valve 23 is introduced into a cavity 93 that serves as a portion of the hydraulic fluid bypass line 22. In the preferred embodiment, the cavity 93 is typically formed in a block 94 that serves as part of the housing for some portion of the pump assembly 2.

Wall or cap 96 of block 94 is bored and tapped to receive the threaded portion 29 of the valve body 24. One boundary 95 of cavity 93 contains a smooth bore 97 which is adapted to receive the unthreaded portion 49 of the valve body 24. In order to create a fluid tight seal, an O-ring 98 is placed in groove 56, with the O-ring 98 being held in place by spacer 99. The O-ring 98 is positioned in groove 56 farther from the threaded section 29 and spacer 99 is positioned in groove 56 nearer to the threaded section 29. As stated earlier, the spring 63 biases the valve tip 52 in the direction of arrow 92, thereby urging the truncated conical head 81 to form a seal with the portion 100 of bypass line 22.

Figure 10:
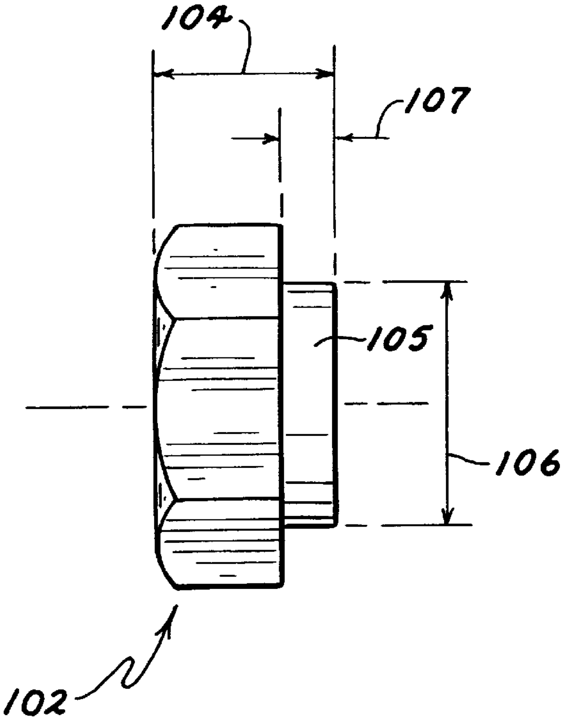
FIG. 10 is a side elevation of a shoulder nut element as used in the present invention.
Figure 11:
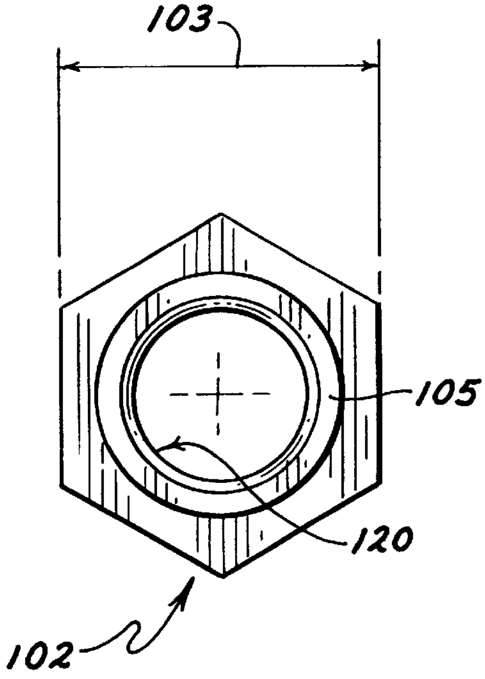
FIG. 11 is a rear elevation of the shoulder nut element as depicted in FIG. 10.

One additional component that is useful in securing the valve 23 to block 94 is shoulder nut 102, best seen in FIGS. 10, 11 and 12. The nut 102 is formed with a hexagonal head having a dimension 103 between opposing faces of 0.938 inch. The head has an overall depth 104 of 0.52 inch, which includes a circular collar 105 having a height 107 of about 0.15 inch. The collar 105 has an outside diameter 106 of approximately 0.75 inch. The inner surface 120 of the collar 105 is threaded to engage the threads 29 of the valve body 24. As seen in FIG. 12, a counterbore 108 is formed in wall 96 that is adapted to receive the collar 105.

Figure 15:
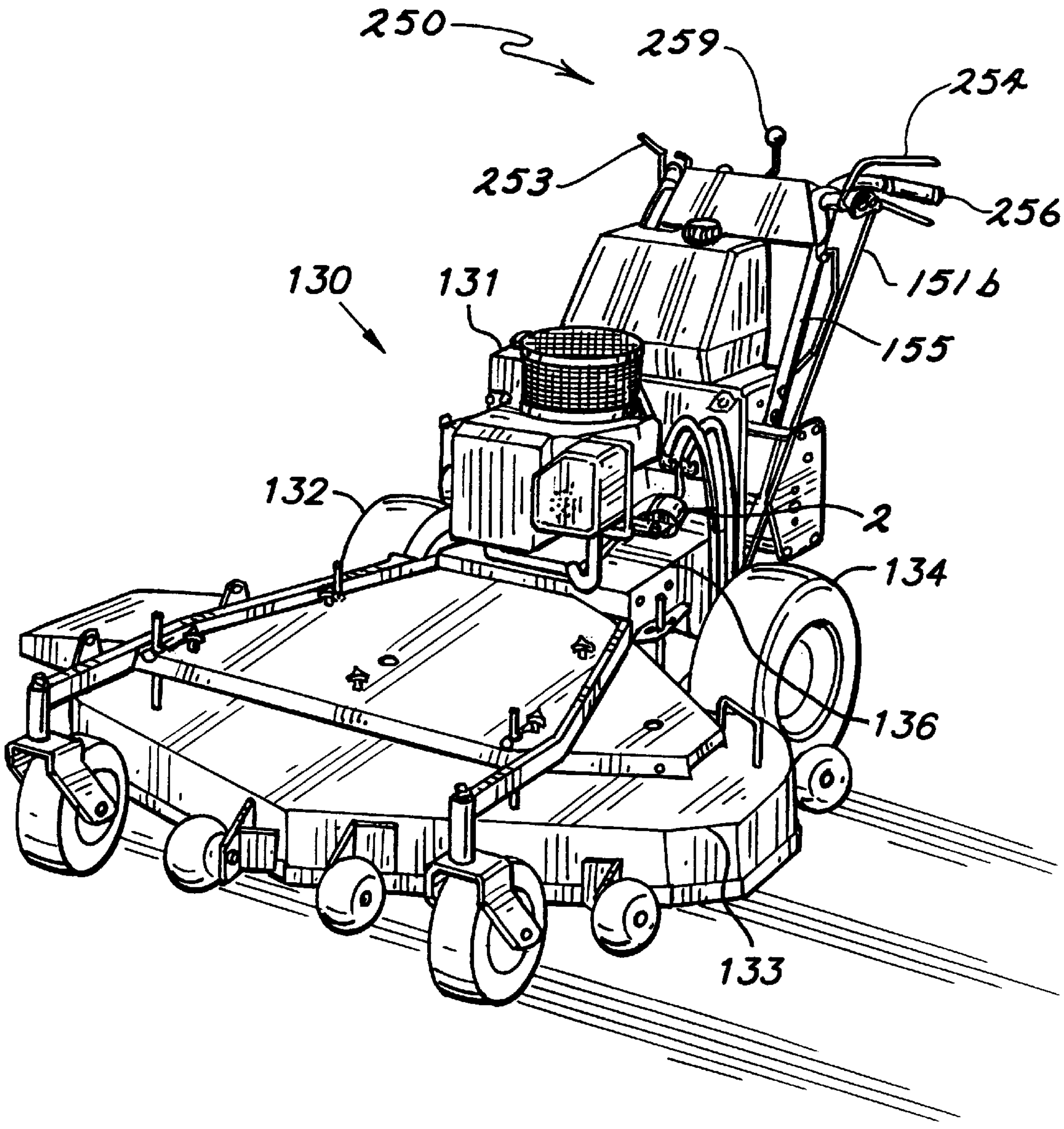
FIG. 15 is a perspective view of a hydraulically driven wide area lawn mower as utilized in the present invention.
Figure 16:
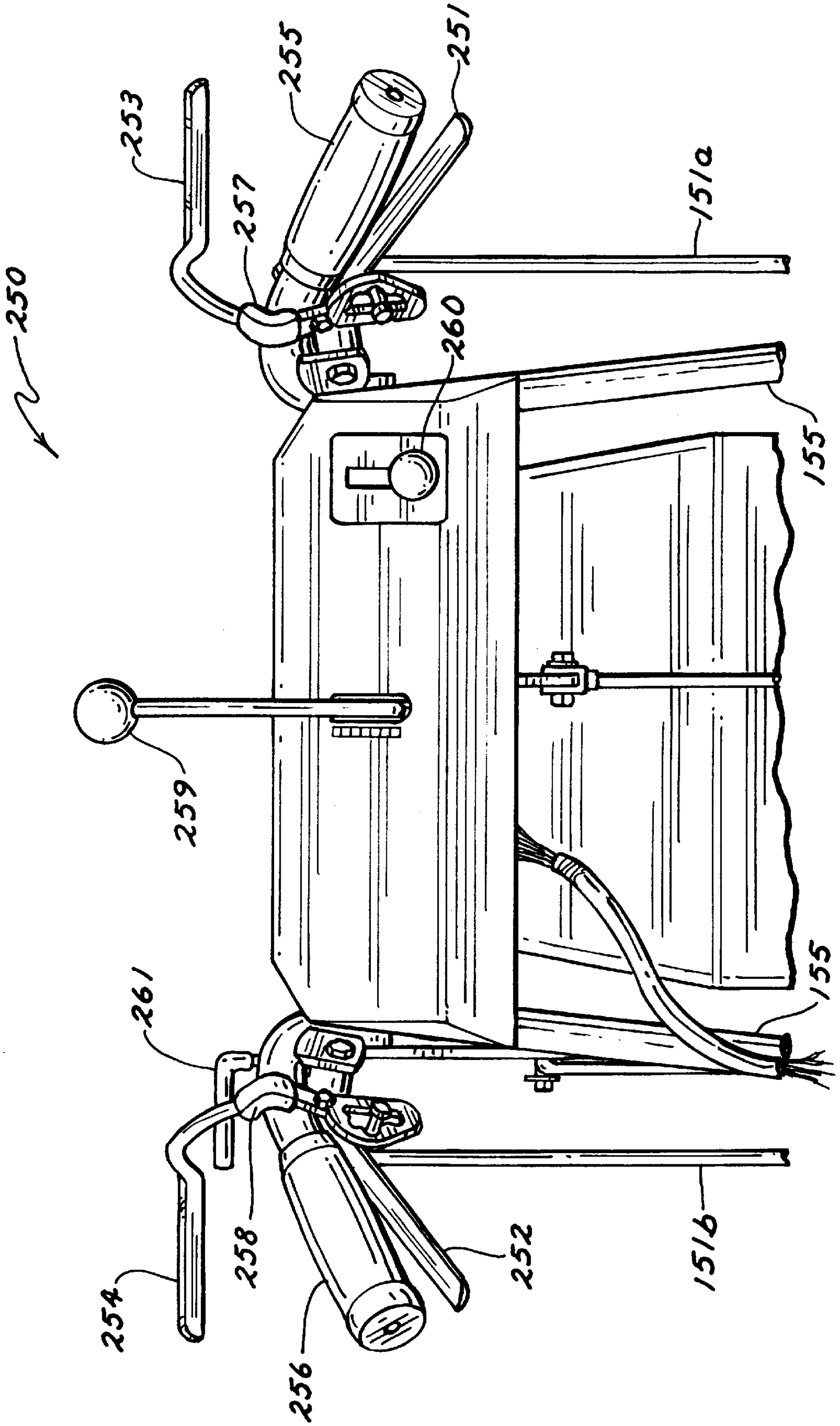
FIG. 16 is a rear elevational view showing a portion of the hydraulic control mechanism of the present invention.

In operation, when the engine 131 is engaged, the pumps 2 will be driven at the same speed. Hydraulic control mechanism 250 includes a neutral position, as depicted in FIG. 15, whereby a negligible pressure differential is developed across the pump lines 17, 18. To commence overall mower 130 movement, the hydraulic control mechanism 250 is actuated away from the neutral position to develop a hydraulic pressure differential across pump lines 17, 18. A more detailed description of the operation of the control mechanism 250 is set forth above. Movement of the right and left hand drive levers 251 and 252 by the operator results in forward or reverse propulsion of the wheel motors at the desired speed which, in turn, results in desired direction and speed of the mower 130.

The operation of the valve 23 can be understood with reference to FIGS. 1, 12, 13 and 14. Hydraulic system 200 includes a bypass line 22 which includes a chamber 93 that permits introduction of the valve 23. In a preferred embodiment, the valve 23 is inserted into bore 97 by rotating head 25 until the shank end wall 77 of the valve tip 52 contacts the bottom of the bore 135. This is achieved with a torque of approximately 50 inch pounds. This position corresponds to compression of the spring 63, with the conical face 81 of the valve tip 52 being firmly pressed against the orifice 100 of bypass line 22. The valve 23 is then loosened by rotating the head 25 in an opposite direction for half a turn, or approximately 180°. The valve 23 is secured in this position by tightening the shoulder nut 102 to a torque value of between 60 and 120 inch pounds. When the motor 2 begins operation in the direction corresponding to forward vehicle movement, leg 109 of bypass line 22 is the high pressure side, while leg 110 of line 22 is the low pressure side. Thus, any increase in hydraulic pressure results in a surge in the direction of arrow 111 (see FIG. 12). As the pressure reaches and exceeds a certain value, the valve tip 52 also moves in the direction of arrow 111, limiting system pressure as some oil slips by valve face 81 of valve tip 52. With the hydraulic pressure thus relieved, the valve tip 52 moves in the direction of arrow 92 in response to the biasing force of spring 63, thus closing the bypass line 22.

Figure 14:
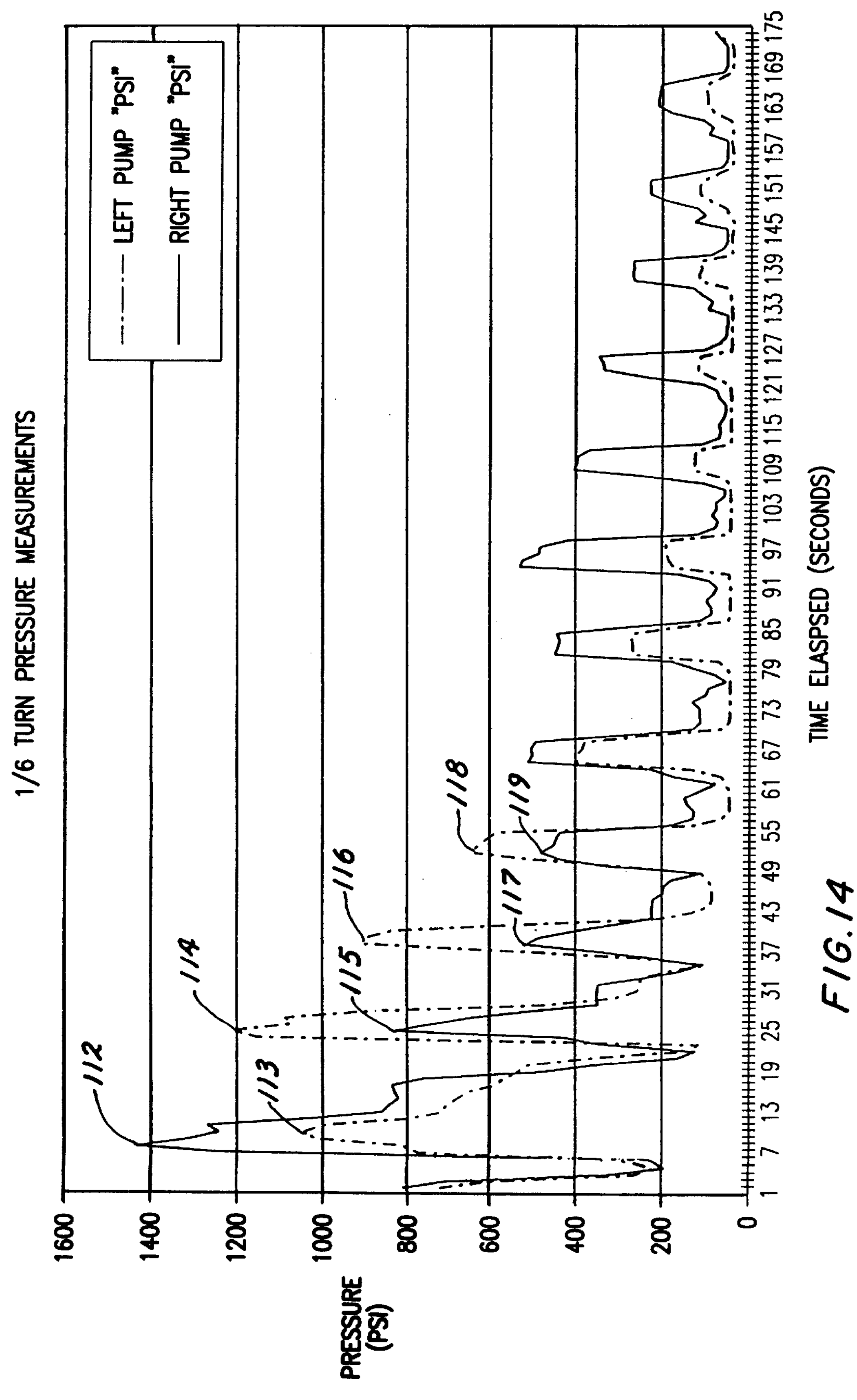
FIG. 14 is a graph showing the relationship between peak hydraulic pressure and the adjustment of the valve of the present invention as used in the hydraulic circuit of FIG. 1.

As seen in FIG. 14, the actual pressure value at which the valve tip 52 moves away from seat 100 is dependent on the degree of compression of spring 63, which is a direct function of the extent to which the valve 23 has been inserted into the chamber 93. FIG. 14 is a recording of actual pressure measurement data for two pumps and motors, one for the left wheel and one for the right wheel of a single test lawn mower, conducted simultaneously. For example, with the valve 23 inserted fully into chamber 93 of both right and left pumps, the peak pressure value 112 in the right hydraulic circuit reaches a peak value 113 of over 1400 psi while the peak pressure in the left side exceeds 1000 psi. At this setting, the shank end wall 77 of the valve tip 52 contacts the bottom of the bore 135, meaning that the valve tip 81 is unable to retract in the direction of arrow 111, as would be the case if a prior art tow valve having no pressure relief function was present in the chamber 93. This indicates that the approximate peak pressure that occurs upon sudden pump engagement is 1000 psi for the left pump as denoted by peak value 113, and to 1400 psi for the right pump as denoted by peak value 112. By loosening (rotating) the valve assembly 23 for each side 60° (⅙ turn), the peak high pressure leg value 114 changes to 1200 psi in the left circuit and the high pressure leg value 115 is just over 800 psi in the right side. An additional loosening rotation of 60° (120° total) for each valve 23 results in a left side peak 116 of about 900 psi and a right side peak 117 of about 500 psi. An additional 60° turn to loosen valves 23 (180° total), reduces the right side surge value 119 to under 500 psi. As is clearly seen in the graph of FIG. 14, valves 23 can be set to a position which will dramatically reduce the peak pressure values which occur in the hydraulic circuit 200, thereby reducing the tendency of the vehicle to lurch or jerk in response to sudden operator input to user control means 150.

The pressure differential between the two pumps is attributable to slight variations in the rolling resistance of wheels 132, 134. For example, if wheel 132 has a higher rolling resistance than wheel 134, it will require more torque in order to initiate rotation. Since torque is proportionally related to hydraulic pressure, the wheel with the higher rolling resistance will also require increased hydraulic pressure. The data shown in FIG. 14 demonstrates this typical non-symmetry in pressure between the left and right pumps. Several factors may contribute to this differential including: variations in hydraulic wheel motor efficiency; non-symmetric weight distribution; and unequal tire pressure. Because these factors can rarely, if ever, be equalized, a pressure differential similar to that demonstrated in FIG. 14 will almost always exist. Nonetheless, the preferred embodiment permits the operator to adjust pressure relief valve 23 of each pump 2 independently to prevent excessive torque in either wheel 132, 134.

The nominal setting for the valves 23 is one-half turn less than full insertion. This setting ensures an adequate pressure relief function for a wide area mower of typical size and weight, thus reducing the frequency and severity of the mower jerking upon rapid acceleration. However, this setting does not relieve so much pressure as to render the mower operating characteristics as sluggish. A lighter mower would require the valves 23 to be turned out more, perhaps as much as one full turn. Conversely, a heavier mower might require the valves 23 to be turned in to a point near, but not at, full insertion. This particular setting might be at ⅙ turn counterclockwise from closed. In extremely hilly conditions with a heavy mower, it might be desirable to have the valves 23 closed all the way so as to provide full hydraulic power to the mower. Obviously, the valve 23 setting should be determined by the operator, the operator's supervisor, or the maintenance specialist of the mower. The terrain upon which the mower is operated will, obviously, be a factor in selecting a valve 23 setting.

As for the tow valve function, it is desirable to have the valves 23 turned counterclockwise 4½ and 5½ turns from their fully closed position. In this position, the valve tips 52 are fully retracted from seats 100 on bypass lines 22. With the valve tips 52 pulled away from seats 100, oil can flow freely between lines 109 and 110 of bypass circuits 22. Thus, when mower 130 is moved with its engine off and the valves 23 retracted, oil flow generated by the rotating motors is free to flow between lines 17 and 18 of the hydraulic circuits 200 through bypass circuits 22. This allows the operator to push or pull the mower 130 with a minimal amount of resistance since the oil can bypass the variable displacement pumps 2 which have a high degree of resistance when they are in neutral. After the mower 130 has been moved, the operator can close the valves 23 back to the desired position for operation as pressure relief valves.

A preferred embodiment of the invention is described above. Those skilled in the art will recognize that many embodiments are possible within the scope of the invention. Variations and modifications of the various parts and assemblies can certainly be made and still fall within the scope of the invention. Thus, the invention is limited only to the apparatus recited in the following claims and equivalents thereof.

I claim:

1. An improved lawn mower comprising:

a) a frame;

b) an engine mounted on the frame;

c) a cutting deck mounted on the frame and receiving power from the engine;

d) a drive wheel mounted on the frame for propelling the mower;

e) a hydraulic pump mounted on the frame, the pump receiving power from the engine;

f) a hydraulic motor upon which the drive wheel is mounted, the motor receiving hydraulic power from the hydraulic pump and the motor providing driving power to the drive wheel;

g) a hydraulic control mechanism for variably supplying hydraulic power from the hydraulic pump to the motor; and h) a combination tow and pressure relief valve wherein the valve relieves excess hydraulic pressure developed between the pump and the motor upon abrupt changes in the position of the hydraulic control mechanism of the mower, wherein the valve can be adjusted to permit the mower to be manually pushed from one point to another with relative ease by allowing hydraulic oil to bypass the pump through a bypass orifice.

2. The lawn mower of claim 1, wherein the combination tow and pressure relief valve relieves excess hydraulic pressure at a value predetermined by the operator, wherein the operator adjusts the valve to the desired value.

3. The lawn mower of claim 2, wherein the valve comprises:

a) an orifice engaging tip with a shank region and a head region;

b) a biasing element abutting the orifice engaging tip, the biasing element urging the orifice engaging tip into an abutting relationship with the bypass orifice residing within a hydraulic circuit formed by the pump and the motor; and c) a valve body oriented in a fixed relationship with the hydraulic circuit, the body retaining the biasing element and the orifice engaging tip such that the biasing member and the orifice engaging tip are movable along a single axis.

4. The lawn mower of claim 3, wherein the valve further comprises a threaded cylindrical region on the valve body, the threaded cylindrical region being adapted to engage a threaded bore residing within the hydraulic circuit.

5. The lawn mower of claim 4, wherein the valve body further comprises a tool engaging head for accepting a tool for rotating the valve body, wherein rotation of the valve body causes the valve body to move axially with respect to the threaded bore residing within the hydraulic circuit, and wherein rotation of the valve body in a first direction causes the valve body to compress the biasing member between the valve body and the orifice engaging tip thus urging the orifice engaging tip against the bypass orifice with greater force and providing a higher hydraulic pressure relief threshold and wherein rotation of the valve body in a second direction causes the valve body to decompress the biasing member thus reducing the force with which the orificing engaging tip engages the bypass orifice and providing a lower hydraulic pressure relief threshold.

6. The lawn mower of claim 5, wherein the valve body further comprises a bore for accepting the shank of the orifice engaging tip, wherein the valve body and the orifice engaging tip can move axially with respect to one another when the shank of the orifice engaging tip is inserted in the bore.

7. The lawn mower of claim 6, wherein the orifice engaging tip comprises:

a) an annular groove formed within a peripheral surface of the shank of the orifice engaging tip; and b) an O-ring residing within the annular groove wherein the O-ring frictionally engages the bore of the valve body when the shank of the orifice engaging tip is inserted into the bore of the valve body.

8. The lawn mower of claim 7, wherein the orifice engaging tip further comprises a bearing surface adapted to abut the biasing element.

9. The lawn mower of claim 8, wherein the biasing element comprises a cylindrical spring with a longitudinal axis, and wherein the cylindrical spring is oriented coaxially with the valve body and the orifice engaging tip when the spring is inserted between the valve body and the head of the orifice engaging tip.

10. The lawn mower of claim 9, wherein sufficient rotation of the valve body in the second direction causes the orifice engaging tip to pull completely away from the bypass orifice, thus providing relatively uninhibited flow of oil through the bypass orifice and permitting the lawn mower to be manually pushed from one point to another with relative ease.

11. The lawn mower of claim 10, wherein the lawn mower comprises:

a) two drive wheels mounted on the frame for propelling the mower;

b) two hydraulic pumps mounted on the frame;

c) two hydraulic motors upon which the drive wheels are mounted wherein each drive wheel is powered by one of the hydraulic pumps and motors and wherein each pump, motor and drive wheel combination is separate from the other pump, motor and drive wheel combination.

* * * * *

UNITED STATES PATENT AND TRADEMARK OFFICE
CERTIFICATE OF CORRECTION

PATENT NO. : 6,089,005
DATED : July 18, 2000
INVENTOR(S) : Kallevig

It is certified that error appears in the above-identified patent and that said Letters Patent is hereby corrected as shown below:

Column 9, claim 1,
Line 38, after "engine", insert -- and developing hydraulic pressure --.
Line 46, delete "combination toward pressure relief".
Line 46, after "valve", insert -- comprising: a pressure relief mechanism that --.
Line 47, delete "wherein the valve".
Line 50, delete "mower,", insert -- mower; a bypass orifice; and --, therefore.
Line 50, delete "wherein the valve can be adjusted" and insert -- a bypass mechanism operable to bypass hydraulic oil through the bypass orifice in order --, therefore.
Line 52, delete "by allowing hydraulic oil to bypass the pump through a bypass orifice".

Column 9, claim 2,
Line 54, delete "combination tow and pressure relief".
Line 55, after "valve", insert -- includes an adjustment mechanism to set the pressure at which the pressure relief mechanism --.
Line 56, delete "at a value predetermined by the operator, wherein the operator adjusts the valve to the desired value".

Column 10, claim 5,
Line 22, delete "orificing" and insert -- orifice --, therefore.

Column 4,
Lines 2 and 20, delete "frame 135" and insert -- frame 136 --, therefore.

Column 5,
Line 25, delete "pump 3" and insert -- pump 2 --, thereofore.

Signed and Sealed this

Eleventh Day of December, 2001

*Attest:*

Nicholas P. Godici

NICHOLAS P. GODICI

*Attesting Officer* *Acting Director of the United States Patent and Trademark Office*